(12) United States Patent
Hasz

(10) Patent No.: US 6,921,582 B2
(45) Date of Patent: Jul. 26, 2005

(54) OXIDATION-RESISTANT COATINGS BONDED TO METAL SUBSTRATES, AND RELATED ARTICLES AND PROCESSES

(75) Inventor: Wayne Charles Hasz, Pownal, VT (US)

(73) Assignee: General Electric Company, Niskayuna, NY (US)

( * ) Notice: Subject to any disclaimer, the term of this patent is extended or adjusted under 35 U.S.C. 154(b) by 19 days.

(21) Appl. No.: 10/329,274

(22) Filed: Dec. 23, 2002

(65) Prior Publication Data

US 2005/0064220 A1 Mar. 24, 2005

(51) Int. Cl.⁷ ............................. B32B 15/04; F03B 3/12
(52) U.S. Cl. ..................... 428/546; 428/652; 428/328; 428/680; 428/679; 428/632; 416/241 R
(58) Field of Search ................................ 428/610, 615, 428/621, 632, 668, 678, 679, 650, 652, 680, 546, 687, 323, 328; 416/241 R

(56) References Cited

U.S. PATENT DOCUMENTS

| | | |
|---|---|---|
| 4,116,723 A | 9/1978 | Gell et al. |
| 4,325,754 A | 4/1982 | Mizuhara et al. |
| 5,399,313 A | 3/1995 | Ross et al. |
| 5,759,932 A | 6/1998 | Sangeeta et al. |
| 6,372,299 B1 | 4/2002 | Thompson et al. |
| 6,451,454 B1 | 9/2002 | Hasz et al. |
| 6,468,669 B1 | 10/2002 | Hasz et al. |

FOREIGN PATENT DOCUMENTS

| | | |
|---|---|---|
| EP | 1088910 | 9/2000 |
| EP | 1103628 | 11/2000 |
| EP | 1136593 | 3/2001 |
| EP | 1172460 | 7/2001 |
| EP | 0821076 | 11/2001 |
| EP | 1338668 | 2/2003 |

OTHER PUBLICATIONS

Epo Search Report dated May 6, 2004 for Corresponding Application.

Primary Examiner—Jennifer McNeil
(74) Attorney, Agent, or Firm—Paul J. DiConza; William Powell

(57) ABSTRACT

An article is described, which includes a metal-based substrate and an oxidation-resistant coating bonded to the substrate by a bonding agent, such as a braze material The oxidation-resistant coating material is often an aluminide- or MCrAlX-type coating, and can be one which contains relatively high amounts of aluminum. The coating is often very smooth, for maximum aerodynamic efficiency. The oxidation-resistant coating can be applied and bonded to the substrate by a variety of methods, using slurries, braze tapes, or metal foils. Coating repair methods are also described.

16 Claims, 1 Drawing Sheet

OXIDATION-RESISTANT COATINGS BONDED TO METAL SUBSTRATES, AND RELATED ARTICLES AND PROCESSES

TECHNICAL FIELD

The invention disclosed herein generally relates to protective coatings for metal substrates. More specifically, the invention is directed to oxidation-resistant coatings for high-temperature substrates, and related processes.

BACKGROUND OF THE INVENTION

Components formed of specialty materials like superalloys are used in various industrial applications, under a diverse set of operating conditions. In many cases, the components are provided with coatings which impart several characteristics, such as corrosion resistance, heat resistance, oxidation resistance, and wear resistance.

Oxidation-resistant coatings are often critical if the underlying component is exposed to an oxidizing atmosphere for an extended period of time. This is especially true in the case of components formed of aluminum-containing superalloys, which are often used in gas turbine engines which operate at elevated temperatures, e.g., 1000° C.–1150° C. In the absence of a protective coating, the oxidizing atmosphere can deplete the superalloy of aluminum. Since aluminum can greatly enhance the oxidation-resistance of the protective coatings, the loss of aluminum can be detrimental to the integrity of the superalloy.

While increasing the aluminum content in the protective coatings often improves oxidation-resistance, the increase may be detrimental to other properties. For example, higher aluminum levels can decrease coating ductility, causing cracking in the coating during service. This in turn results in the loss of the hermetic, protective nature of the coating.

Many of the oxidation-resistant coatings for superalloys are formed from conventional alloys of the formula MCrAlX, where M is iron, nickel, or cobalt. "X" is one of the elements mentioned below, in a more detailed description of the coating. In many instances, the oxidation-resistant coating is used as the most external layer of a component, e.g., a turbine engine blade. In that case, the coating often has to be very smooth, for maximum aerodynamic efficiency.

Some of the thermal spray techniques are often used to deposit oxidation-resistant coatings with a desired surface texture. Examples of the thermal spray processes are high velocity oxy-fuel (HVOF) and vacuum plasma spray (VPS). Each of these techniques has attributes which make it suitable for a given situation. For example, VPS applications are often desirable when it is critical that the final coating be substantially free of internal oxides.

While these types of thermal spray techniques are quite suitable for applying oxidation-resistant coatings under many circumstances, they exhibit drawbacks in other situations. For example, VPS and HVOF techniques are sometimes not effective for applying the coatings to regions of a substrate which are somewhat inaccessible. The spray equipment may be too large and cumbersome for such regions. As an illustration, it can be very difficult to thermally spray a coating on a flange of a turbine engine part. Moreover, applying the coating to any internal cavity in the part can be problematic.

Furthermore, thermal spray processes may include one or more masking steps. These steps can be very time-consuming. Thus, it is often very difficult to carry out local repairs using the processes.

It should thus be apparent that new methods for efficiently applying oxidation-resistant coatings to a substrate would be welcome in the art. The methods should be capable of providing a coating with substantially the same quality as coatings applied by thermal spray processes. Moreover, it would be desirable if the new methods were capable of applying the coating to inaccessible regions of a substrate. Furthermore, the methods should be compatible with any other fabrication processes to which the substrate is being subjected. It would also be very beneficial if the new methods allowed one to readily change the composition of the oxidation-resistant coating, to satisfy the needs of a particular substrate. It would also be desirable if the coating method were applicable to local (small area) application, for "new make" and in-situ repair of oxidation-resistant coatings.

SUMMARY OF THE INVENTION

One embodiment of the present invention is directed to a an article, comprising a metal-based substrate and an oxidation-resistant coating bonded to the substrate by a bonding agent. The oxidation-resistant coating materials are often aluminide or MCrAlX-type coatings, discussed in detail below. In some preferred embodiments, the oxidation-resistant coating is an "aluminum-rich" coating. Such coatings often contain about 10 atomic % to about 50 atomic % aluminum.

The bonding agent is often a braze material. Such materials usually include at least one metal selected from the group consisting of nicked, cobalt, iron, and a precious metal. Very often, the braze material comprises at least about 40% by weight nickel.

The oxidation-resistant coating can be applied and bonded to the substrate by a variety of methods, discussed in more detail below. For example, the coating material and the bonding agent material can be premixed to form a slurry. The slurry can be applied to the substrate by various techniques, and then heated to fuse the coating to the substrate with the bonding agent.

As an alternative, the oxidation-resistant coating and the bonding agent can first be formed into a "sheet", i.e., a green tape or a metal foil. Green tapes can be fabricated by a variety of techniques, as described below. The sheet can then be cut to a desired size, and temporarily attached to the substrate. Sufficient heat can then be applied to fuse the sheet to the substrate. In some embodiments, two separate green sheets could be used—one formed of an oxidation-resistant coating material, and the other formed of the bonding agent material.

Techniques for fabricating the metal foils are also discussed below. The foil can be sized and attached to the substrate by various means. Sufficient heat is then applied to fuse the foil to the substrate.

Another embodiment of the invention is directed to a method for replacing an oxidation-resistant coating applied over a metal-based substrate. The existing oxidation-resistant coating (or portions thereof) is first removed by conventional techniques. The new oxidation-resistant coating is then applied as described herein, e.g., in the form of a slurry, tape, or foil. The new coating can then be fused to the substrate.

Further details regarding the various features of this invention are found in the remainder of the specification, and in the accompanying drawings.

DETAILED DESCRIPTION OF THE INVENTION

Figure 1:
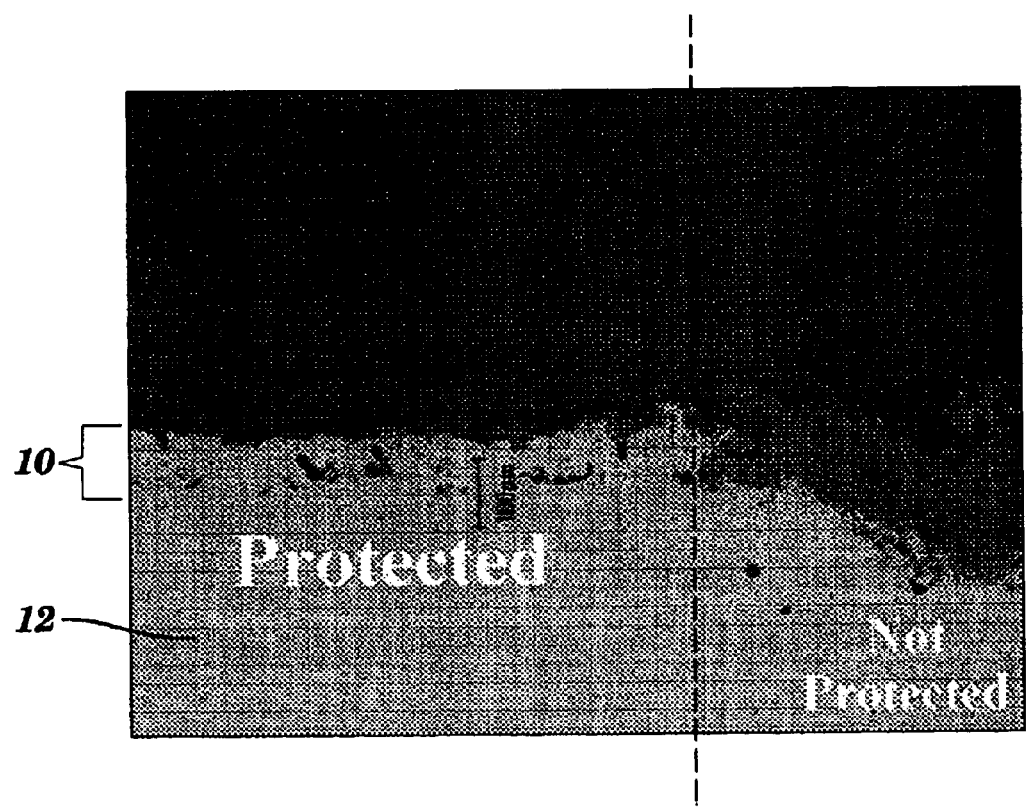
FIG. 1 is a cross-sectional photomicrograph of a coating system which includes an oxidation-resistant coating fused to a substrate.

As mentioned above, the article of this invention includes a metal-based substrate. A wide variety of metals and metal alloys can be used as the substrate. The term "metal-based" in reference to substrates disclosed herein refers to those which are primarily formed of metal or metal alloys, but which may also include some nonmetallic components, e.g., ceramic sections. Usually, the substrate is a heat-resistant alloy, e.g., superalloys which typically have an operating temperature of up to about 1000–1150° C. (The term "superalloy" is usually intended to embrace complex cobalt- or nickel-based alloys which include one or more other elements, such as aluminum, tungsten, molybdenum, titanium, and iron.) Superalloys are described in various references, such as U.S. Pat. Nos. 5,759,932; 5,399,313 and 4,116,723, all incorporated herein by reference. High temperature alloys are also generally described in Kirk-Othmer's *Encyclopedia of Chemical Technology*, 3rd Edition, Vol. 12, pp. 417–479 (1980), and Vol. 15, pp. 787–800 (1981). The type of substrate can vary widely, but it is often in the form of a jet engine part, such as a turbine nozzle or blade.

Various types of oxidation-resistant coatings can be bonded to the substrate. Many of them comprise an alloy of the formula MCrAlX, where M is selected from the group consisting of Fe, Ni, Co, and mixtures of any of the foregoing. In that formula, X is selected from the group consisting of Y, Ta, Si, Hf, Ti, Zr, B, C, and combinations thereof. These types of coatings are generally well-known in the art, and described, for example, in U.S. Pat. No. 6,372,299 (Thompson et al), which is incorporated herein by reference. Many of these types of alloys have a general composition, by weight, of about 5% to about 30% chromium; about 4.5% to about 12.5% aluminum and about 0.1% to about 1.2% yttrium; with M constituting the balance.

Other types of metallic coatings can also be used as the oxidation-resistant coatings. Examples include aluminide-type coatings such as aluminide itself, platinum-aluminide; nickel-aluminide; platinum-nickel-aluminide; and mixtures thereof.

In some embodiments, the oxidation-resistant coating is an aluminum-rich material. Aluminum-rich coatings are known in the art. For example, they are generally described in U.S. Pat. No. 6,372,299, mentioned previously. As used herein, the term "aluminum-rich" generally refers to a coating which contains enough aluminum to compensate for any loss of aluminum from the substrate during its service life. In the case of many turbine engine components, the service life is typically in the range of about 100 hours to about 1,000,000 hours, at temperatures in the range of about 750° C. to about 1250° C. (Usually, the service life occurs in temperature cycles, e.g, room temperature to elevated temperatures, and back to room temperature). In the case of many of the aluminum-rich coatings, the total amount of aluminum present is in the range of about 10 atomic % to about 50 atomic %. Moreover, as described in the Thompson patent referenced above, the aluminum-rich coatings sometimes form a discontinuous layer of aluminum-rich particles in a matrix of metallic alloy (e.g., a conventional MCrAlX bond coat material). These coatings usually have a contiguity fraction of less than about 65%. The amount of aluminum in the aluminum-rich particles usually exceeds the amount of aluminum in the substrate by about 0.1 atomic % to about 40 atomic %.

As also described in Thompson et al, the aluminum-rich coating is sometimes formed from two components. Component (I) usually includes particles of aluminum and a second metal, such as nickel. Component (II) often contains particles of an MCrAlX alloy, as described previously. The relative proportions of components (I) and (II) will depend in part on the expected tendency for aluminum depletion and replenishment for the coating, as described in Thompson et al. In general, the level of component (I) is at least about 1% by volume, based on the total volume of components (I) and (II). In preferred embodiments, the level of component (I) is in the range of about 5% by volume to about 50% by volume. Methods for preparing these and other types of aluminum-rich coatings are described in U.S. Pat. No. 6,372,299.

In preferred embodiments, the oxidation-resistant coating has a smooth surface. Such a service is desirable, for example, when the coating is applied to a particular turbine engine component which requires aerodynamic efficiency, such as a blade. (Unlike some of the prior art coatings, coatings of this invention often constitute the outer coating of a part, e.g., without any overlying layer, such as a ceramic coating.) For these embodiments, the oxidation-resistant coating has an average roughness value "Ra" of less than about 200 micro-inches. In especially preferred embodiments, the Ra is less than about 90 micro-inches.

Various ways are available for ensuring that the coatings have a desired smoothness. The technique by which the coating is applied often influences the surface profile or "texture". (For example, coatings applied by HVOF (high velocity oxy-fuel) are often relatively smooth, but may be further smoothened by subsequent processing.

Moreover, the particle size of the material forming the coating can be the primary factor in determining the surface roughness. In general, finer particles result in a smoother coating. Thus, in many preferred embodiments, the particles for the oxidation-resistant coating have an average diameter of less than about 75 microns (–200 mesh), and preferably, less than about 45 microns (–325 mesh).

As mentioned above, the oxidation-resistant coating can be applied to the substrate by a variety of processes. Most of them involve the use of a bonding agent, such as a braze. Braze materials are well-known in the art, and often comprise at least one metal selected from the group consisting of nickel cobalt, iron, a precious metal, and a mixture which includes at least one of the foregoing. Some braze compositions are described in the "Kirk-Othmer Encyclopedia of Chemical Technology", 3rd Edition, Vol. 21, pages 342 et seq. The composition of the braze alloy is preferably similar to that of the substrate to which the coating is being applied. For example, if the article is formed of a nickel-based superalloy, the braze alloy can be formed of a similar nickel-based superalloy composition (usually containing at least about 40% by weight nickel). The braze alloy composition may also contain silicon and/or boron, which serve as melting point suppressants.

Exemplary nickel-base braze alloy compositions (approximate) are provided below. The components are designated in weight percent:

1) 4.5 Si, 14.5 Cr, 3.3 B, and 4.5 Fe, balance Ni;
2) 15 Cr, 3.5 B, balance Ni;

3) 4.5 Si, 3 B, balance Ni;
4) 4.2 Si, 7 Cr, 3 B, and 3 Fe, balance Ni;
5) 10 Si, 19 Cr, balance Ni;
6) 3.5 Si, 22 Co, 2.8 B, balance Ni;
7) 3.5 Si, 1.8 B, balance Ni;
8) 4.5 Si, 14 Cr, 3 B, and 4.5 Fe, balance Ni;
9) 17 Cr, 9 Si, 0.1 B, balance Ni;
10) 2.6 Si, 2 Cr, 2 B, and 1 Fe, balance Ni;
11) 15 Cr, 8 Si, balance Ni;
12) 10.1 Si, 19.0 Cr, balance Ni;
13) 4.5 Fe, 4.5 Si, 14.0 Cr, 3.1 B, 0.75 C, balance Ni;
14) 4.5 Fe, 4.5 Si, 14.0 Cr, 3.1 B, balance Ni;
15) 4.5 Si, 3.1 B, balance Ni;
16) 11.0 P, balance Ni;
17) 10.1 P, 14.0 Cr, balance Ni; and
18) 19 Cr, 7.3 Si, 1.5 B, balance Ni.

Some preferred nickel-base braze alloy compositions for the present invention comprise at least one of silicon, chromium, boron, and iron, with the balance being nickel. Mixtures of silicon and boron are sometimes employed. As one particular, non-limiting example, some of these compositions comprise about 5 wt % to about 15 wt % silicon or boron; and about 15 wt % to about 25 wt % chromium, with the balance being nickel.

Exemplary cobalt-base braze alloy compositions (approximate) include:
1) 8 Si, 19 Cr, 17 Ni, 4 W, 0.8 B, balance Co; and
2) 17.0 Ni, 1.0 Fe, 8.0 Si, 19.0 Cr, 0.8 B, 0.4 C, balance Co.

Other types of braze alloys could be used as well. Non-limiting examples include precious metal compositions containing silver, gold, and/or palladium, in combination with other metals, such as copper, manganese, nickel, chrome, silicon, and boron. Mixtures which include at least one of the braze alloy elements are also possible. Many of the metal braze compositions are available from vendors such as Sulzer Metco, Vitta, and Praxair Surface Technologies, Inc.

In one embodiment, the bonding agent and oxidation-resistant coating material can be applied to the substrate in the form of a slurry. For example, a braze alloy and a powdered form of the oxidation-resistant coating can be combined with a binder material, and optionally, at least one solvent. Conventional details about slurries are described in various references. U.S. Pat. Nos. 4,325,754; 5,759,932; and 6,451,454 are illustrative, and incorporated herein by reference.

A variety of binder materials may be used in the slurry. Non-limiting examples include water-based organic materials such as polyethylene oxide and various acrylics, or solvent-based binders. The slurry may also contain various other additives, as described in several of the patents referenced above.

Selection of one or more solvents (when used) for the slurry depends on various factors. One factor is the capacity of the solvent for solubilizing the binder and dispersing the braze powder and coating powder. Another factor relates to the technique by which the slurry will be applied to the substrate. The braze material can usually be dispersed in either an aqueous or organic solvent. Examples of possible solvents include water, ethanol or other alcohols; ketones, nitrile solvents (e.g., acetonitrile); ketone-type solvents like acetone; and aromatic solvents like toluene, xylene, or xylenol; as well as compatible mixtures thereof.

A variety of techniques can be used to apply the slurry to the substrate. Examples include slip-cap, brushing, painting, dipping, flow-coating, roll-coating, spin coating, and spraying. Various texts are instructive in this regard, e.g., the "Kirk-Othmer Encyclopedia of Chemical Technology", 4th Edition, Vol. 5, pp. 606–619; as well as the "Technology of Paints, Varnishes and Lacquers", Edited by C. Martens, Reinhold Book Corporation, 1968. Those skilled in the art will be able to readily determine the most appropriate technique for a particular slurry composition. In general, use of a slurry composition containing the bonding agent and oxidation-resistant coating material is advantageous in various situations. For example, when the substrate surface is irregular, or contains pits and crevices, the slurry can effectively fill those regions.

In preferred embodiments, some or all of the volatile components in the slurry are removed before the fusing step. Removal of the volatile components at this stage can help in preventing bubbling, blistering, and similar problems. The volatiles are usually removed by heating, as described in the above-referenced patent, U.S. Pat. No. 5,759,932. Those skilled in the art can select the most effective heating regiment without undue effort.

The bonding agent/binder/coating material component can then be fused to the substrate. Fusing techniques are known in the art, and are usually selected according to the nature of the bonding agent. When the bonding agent is a braze material, standard brazing techniques are employed. Brazing temperatures depend in part on the type of braze alloy used, and are typically in the range of about 525° C. to about 1650° C. In the case of nickel-based braze alloys, braze temperatures are usually in the range of about 800° C. to about 1260° C.

When possible, brazing is often carried out in a vacuum furnace. The amount of vacuum will depend in part on the composition of the braze alloy. Usually, the vacuum will be in the range of about $10^{-1}$ torr to about $10^{-8}$ torr. If the bonding agent/binder/coating material is to be applied to an area which does not lend itself to the use of a furnace, other heating techniques may be used. For example, the referenced U.S. Pat. No. 6,451,454 mentions the use of a torch or some of the other localized heating means. General examples include induction (RF) techniques, infrared heating (IR), and the like. In non-vacuum brazing situations, coating oxidation should be prevented during fusion. This is usually accomplished by including a flux in the coating mix, or by employing an inert cover gas.

As an alternative, two separate slurries can be employed. The first slurry would include the oxidation-resistant coating particles, along with one or more of the optional constituents discussed above, e.g., a binder. The second slurry would include the bonding agent, along with any other appropriate additives. The slurries could be premixed or applied individually over the substrate.

Another technique for applying the oxidation-resistant coating to the substrate utilizes the slurry composition described above, as part of a tape casting process. In one embodiment, the slurry composition of coating material, braze, and binder is taped to produce a free-standing sheet or tape. Tape casting methods are known in the art, and described, for example, in the referenced U.S. Pat. No. 6,451,454. Usually, the slurry is tape-cast onto a removable support sheet, such as a plastic sheet formed of a material such as Mylar®. Substantially all of the volatile material in the slurry is then allowed to evaporate. The removable support sheet is then detached from the green braze tape. The resulting tape usually has a thickness in the range of about 1 micron to about 500 microns. Braze and braze/base-metal tapes of this type are commercially available.

The free-standing, green tape can be cut to a size appropriate for the site on the substrate where the coating is desired. Various techniques can be used to temporarily hold the tape in place, prior to fusing. As an example, an adhesive may be employed. Any adhesive suitable for attaching the tape to the substrate material would be suitable, provided that it completely volatilizes during the fusing step.

Another simple means of attachment is used in some embodiments. The green braze tape can be placed on a selected portion of the substrate, and then contacted with a solvent that partially dissolves and plasticizes the binder, causing the tape to conform and adhere to the substrate surface. As an example, toluene, acetone or another organic solvent could be sprayed or brushed onto the braze tape after the tape is placed on the substrate. The tape can then be fused to the substrate as described previously, e.g., by brazing.

As an alternative, two separate green tapes can be utilized. The first tape is formed of the bonding agent, e.g., a braze tape. The second tape is formed of the oxidation-resistant coating material, and has a thickness sufficient for providing the desired coating depth, after the fusing step. The second tape also includes a binder (as described above), and optionally, one or more solvents. The tapes can be fabricated as described previously, e.g., deposition onto a removable support sheet, and detachment therefrom.

The tapes can be stacked over the desired area on the substrate. Usually, the coating material tape is situated closest to the substrate, while the bonding agent tape is applied on top. (In one embodiment, the two tapes can be attached to each other beforehand, to form a free-standing bilayer. Attachment means are as described above, e.g., adhesives or plasticizing solvents). When the two tapes are heated, the bonding agent tape will melt and infiltrate into the oxidation-resistant coating material. Thus, the bonding agent material, e.g., braze, serves to densify the coating, while also fusing it securely to the substrate. (In some embodiments, the position of the two tapes could be switched, i.e., with the bonding agent tape closest to the substrate, and the coating material tape on top). The use of the two separate tapes has advantages in some instances. For example, it can minimize the occurrence of mud-flat cracks which sometimes occur due to in-plane shrinkage during heating steps.

Still another technique for applying the oxidation-resistant coating to the substrate utilizes a metal sheet or "foil". In this technique, powders of the oxidation-resistant coating material and the bonding agent (usually a braze powder) are combined and deposited onto a support sheet. Various thermal spray techniques are usually used for deposition onto the support sheet, such as vacuum plasma deposition, HVOF (high velocity oxy-fuel), or air plasma (AP) spray. Other deposition techniques could be employed as well, e.g., sputtering or physical vapor deposition (PVD). The support sheet is then removed, leaving the desired metal foil. Foils of this type can also be prepared by other methods as well. For example an amorphous metal ribbon technique can be used, as described in U.S. Pat. No. 6,468,669 (Hasz et al), which is incorporated herein by reference. Another method to make coating foils is the "pre-forming" technique, wherein the previously-described green tape is partially fired (off the part), to formula metallic sheet.

Prior to the fusing-step, the foil can be temporarily held in place on the substrate by various techniques. Exemplary techniques include spot-welding, tack-welding, use of adhesives, and the like. The foil and surrounding area is then heated to a temperature sufficient to fuse the oxidation-resistant coating to the substrate surface, as described previously.

Another embodiment of this invention is directed to a method for replacing an oxidation-resistant coating previously applied to a metal-based substrate. The periodic replacement of the oxidation-resistant coating (or a portion thereof) is often critical in high temperature components, like turbine engine parts. Very often, such i coating has to be repaired or replaced while the turbine is in service, i.e., after its delivery from the manufacturing site. The process disclosed herein provides a means for rapidly repairing or replacing selected areas of an existing coating system, without having to completely remove the coating from the entire part. Thus, the process is very suitable for replacing the coatings on relatively small sections of the part, e.g., those sections most adversely affected by oxidation-attack. Moreover, the process is especially useful for repairing coatings which are situated in areas not easily accessible to other repair techniques.

The steps for replacing the oxidation-resistant coating usually comprise the following:

(I) removing the existing oxidation-resistant coating from a selected area on the substrate, if such a coating is worn or damaged (e.g., oxidized, cracked, or eroded);

(II) applying a new oxidation-resistant coating in the form of a slurry or a sheet to the substrate; and then (III) fusing the new oxidation-resistant coating to the substrate with a bonding agent.

Step (I) is carried out by conventional methods, e.g., grit-blasting, etching, and the like. In regard to step (II), the new oxidation-resistant coating is based on one of the coating materials described previously. It can be applied by various techniques (also described above), e.g., in the form of a slurry, foil, or tape. For step (III), fusing can be carried out by conventional techniques (e.g., a furnace). However, other techniques may be more suited to a particular situation, e.g., for repairs at a remote site without sufficient facilities, or repairs in relatively inaccessible locations on or within a part. In those instances, a torch or other portable heating apparatus (such as induction or IR heating systems) could be used to fuse the new coating to the substrate, e.g., by brazing.

It should be apparent from the previous discussion that another embodiment of this invention is directed to an article. The article includes an oxidation-resistant coating, as described above, which can contain relatively high levels of aluminum. (The coating can also function as a bond coat in some situations). The coating is bonded to the substrate by a bonding agent, e.g., a braze material. The bonding agent forms a continuous matrix phase, e.g., a superalloy braze matrix, in which the coating particles are embedded. Thus, for many embodiments, the high aluminum-content coatings provide the oxidation protection, while the matrix phase provides coating ductility, as well as adhesive- and cohesive strength.

The article can be in the form of a variety of components used in high-temperature applications. For example, the component can be a turbine engine part, e.g.,.a turbine blade. These blades are usually made from the superalloy materials, which require a great deal of oxidation protection during their service life. The coating itself can be selectively modified in composition, to meet the particular requirements of the turbine part, e.g., in terms of aluminum content, surface smoothness, and the like.

EXAMPLES

The following example is merely illustrative, and should not be construed to be any sort of limitation on the scope of the claimed invention. All parts are provided in weight percent, unless otherwise indicated.

The oxidation-resistant coating material was a NiCrAlY-type powder, having a nominal composition as follows: 68 wt % Ni, 22 wt % Cr, 9 wt % Al, and 1 wt % Y. The powder had a particle size of less than 45 microns (−325 mesh). The braze material was a high temperature NiCrSi braze powder, with the following approximate composition: 10% by weight silicon; 19% by weight chromium, base nickel. The particle size of the braze powder was less than 45 microns (−325 mesh). A slurry was formed from the two powders, using polyethylene oxide as the binder, and water as the solvent. A 20 mil (508 microns)-thick green (unfired) oxidation coating tape was then tape-cast from the mixture.

The substrate was a coupon made from a standard Ni/Co superalloy. Prior to use, the coupon was grit-blasted and ultrasonically cleaned. The oxidation-resistance coating tape was then attached to a portion of the substrate surface, using braze adhesive. The substrate was then vacuum-fired to 1204° C. (2200° F.) for 30 minutes, producing an oxidation-resistant coating on the substrate surface.

Furnace cycle testing (FCT) was carried out for the sample, with one cycle representing 45 minutes at 2000° F. (1093° C.), with subsequent cool-down to 130–150° F. (54–66° C.) in 10 minutes.

FIG. 1 is a photomicrograph of a cross-section of the coupon, after 500 FCT cycles. In the figure, oxidation-resistant coating 10 has been fused to the substrate 12 on the left side (marked as "Protected"). This metellography demonstrates that there was no excessive oxidation in the brazed coating at 500 cycles. Thus, the substrate remained protected. A contrast is clearly evident on the right side of the figure (marked as "Not protected"). There, in the absence of the oxidation-resistant coating, severe oxidation occurred within the upper region of substrate 12.

Many modifications and variations of the present invention are possible, in light of the above teachings. It is therefore to be understood that, within the scope of the appended claims, the invention may be practiced otherwise than as specifically described.

What is claimed:

1. An article comprising:
   (a) a metal-based substrate; and
   (b) an oxidation-resistant coating bonded to the substrate by a bonding agent, and comprising about 10 atomic % to about 50 atomic % aluminum.

2. The article of claim 1, wherein the oxidation-resistant coating comprises an alloy of the formula MCrAlX, where M is selected from the group consisting of Fe, Ni, Co, and mixtures of any of the foregoing; and where X is selected from the group consisting of Y, Ta, Si Hf, Ti, Zr, B, C, and combinations thereof.

3. The article of claim 1, wherein the coating is a discontinuous layer of aluminum-rich particles in a matrix of a metallic alloy, and the amount of aluminum in the particles exceeds the amount of aluminum in the substrate by about 0.1 atomic % to about 40 atomic %.

4. The article of claim 1, wherein the coating is a discontinuous layer of aluminum-rich particles in a matrix of a metallic alloy, and the coating has a contiguity fraction of less than about 65%.

5. The article of claim 1, wherein the coating comprises particles of a first component (component I) and a second component (component II).

6. The article of claim 1, wherein the oxidation-resistant coating comprises a material selected from the group consisting of aluminide, platinum-aluminide; nickel-aluminide; platinum-nickel-aluminide; and mixtures thereof.

7. The article of claim 1, wherein the braze material comprises at least one metal selected from the group consisting of nickel, cobalt, iron, a precious metal, and a mixture which includes at least one of the foregoing.

8. The article of claim 1, wherein the braze material comprises at least about 40% by weight nickel.

9. The article of claim 1, wherein the oxidation-resistant coating is applied to the substrate by a technique selected from the group consisting of slurry deposition, tape casting, foil application, and combinations of these techniques.

10. The article of claim 1, wherein the oxidation-resistant coating is a bond coat.

11. The article of claim 10, wherein a thermal barrier coating lies over the bond coat.

12. An article, comprising:
   (a) a metal-based substrate; and
   (b) an aluminum-rich, oxidation-resistant coating bonded to the substrate by a bonding agent, wherein said coating comprises particles of component I, which comprises particles of aluminum and a second metal, and component (II), which comprises particles of an alloy of the formula MCrAlX, where M is selected from the group consisting of Fe, Ni, Co, and mixtures of any of the foregoing; and where X is selected from the group consisting of Y, Ta, Si, Hf, Ti, Zr, B, C, and combinations thereof.

13. The article of claim 12, wherein the second metal for component (I) is nickel.

14. An article, comprising:
   (a) a metal-based substrate; and
   (b) an oxidation-resistant coating bonded to the substrate by a bonding agent, wherein the oxidation-resistant coating has an average roughness value "Ra" of less than about 200 micro-inches.

15. The article of claim 14, wherein the oxidation-resistant coating has an average roughness value "Ra" of less than about 90 micro-inches.

16. A turbine engine component comprising a superalloy material, and including an oxidation-resistant coating which contains about 10 atomic % to about 50 atomic % aluminum, bonded to at least a portion of a surface of the component, wherein the coating comprises an aluminide material or an alloy of the formula MCrAlX, where M is selected from the group consisting of Fe, Ni, Co, and mixtures of any of the foregoing; and where X is selected from the group consisting of Y, Ta, Si, Hf, Ti, Zr, B, C, and combinations thereof.

* * * * *

UNITED STATES PATENT AND TRADEMARK OFFICE
CERTIFICATE OF CORRECTION

| | |
|---|---|
| PATENT NO. | : 6,921,582 B2 |
| APPLICATION NO. | : 10/329274 |
| DATED | : July 26, 2005 |
| INVENTOR(S) | : Wayne C. Hasz |

It is certified that error appears in the above-identified patent and that said Letters Patent is hereby corrected as shown below:

Column 8, Line 6, which incorrectly reads as follows:

"like turbine engine parts. Very often, such i coating has to be"

Column 8, Line 6 should read as follows:

"like turbine engine parts. Very often, such a coating has to be"

Claims 1, 3, 4, 12 and 16 were incorrectly printed. The claims should read as follows:

<u>Col. 9, line 43,</u>
Claim 1. An article comprising:

(a) a metal-based substrate; and (b) an oxidation-resistant coating bonded to the substrate by a braze material, wherein the coating comprises a discontinuous layer of aluminum-rich particles in a matrix of a metallic alloy, said coating comprising about 10 atomic % to about 50 atomic % aluminum.

<u>Col. 9, line 54,</u>
Claim 3. The article of claim 1, wherein the amount of aluminum in the aluminum-rich particles exceeds the amount of aluminum in the substrate by about 0.1 atomic % to about 40 atomic %.

<u>Col. 10, line 1,</u>
Claim 4. The article of claim 1, wherein the coating has a contiguity fraction of less than about 65%.

UNITED STATES PATENT AND TRADEMARK OFFICE
CERTIFICATE OF CORRECTION

PATENT NO. : 6,921,582 B2
APPLICATION NO. : 10/329274
DATED : July 26, 2005
INVENTOR(S) : Wayne C. Hasz It is certified that error appears in the above-identified patent and that said Letters Patent is hereby corrected as shown below:

Col. 10, line 25,

Claim 12. An article, comprising:

(a) a metal-based substrate; and (b) an aluminum-rich, oxidation-resistant coating bonded to the substrate by a bonding agent, wherein said coating comprises particles of component (I), which comprises particles of aluminum and a second metal, and component (II), which comprises particles of an alloy of the formula MCrAlX, where M is selected from the group consisting of Fe, Ni, Co, and mixtures of any of the foregoing; and where X is selected from the group consisting of Y, Ta, Si, Hf, Ti, Zr, B, C, and combinations thereof."

Col. 10, line 48,

Claim 16. A turbine engine component comprising a superalloy material, and including an oxidation-resistant coating which contains about 10 atomic % to about 50 atomic % aluminum, bonded to at least a portion of a surface of the component by a braze material, wherein the coating comprises a discontinuous layer of aluminum-rich particles in a matrix of a metallic alloy, said coating comprising an aluminide material or an alloy of the formula MCrAlX, where M is selected from the group consisting of Fe, Ni, Co, and mixtures of any of the foregoing; and where X is selected from the group consisting of Y, Ta, Si, Hf, Ti, Zr, B, C, and combinations thereof."

Signed and Sealed this

Eighth Day of August, 2006

JON W. DUDAS
*Director of the United States Patent and Trademark Office*